United States Patent
Chen et al.

(10) Patent No.: US 12,425,623 B2
(45) Date of Patent: Sep. 23, 2025

(54) AMVP-MERGE MODE WITH SBTMVP

(71) Applicant: Tencent America LLC, Palo Alto, CA (US)

(72) Inventors: Lien-Fei Chen, Hsinchu (TW); Xin Zhao, San Jose, CA (US); Roman Chernyak, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 81 days.

(21) Appl. No.: 18/406,411

(22) Filed: Jan. 8, 2024

(65) Prior Publication Data
US 2024/0236350 A1  Jul. 11, 2024

Related U.S. Application Data

(60) Provisional application No. 63/437,986, filed on Jan. 9, 2023.

(51) Int. Cl.
| | |
|---|---|
| *H04N 19/44* | (2014.01) |
| *H04N 19/105* | (2014.01) |
| *H04N 19/137* | (2014.01) |
| *H04N 19/176* | (2014.01) |

(52) U.S. Cl.
CPC .......... *H04N 19/44* (2014.11); *H04N 19/105* (2014.11); *H04N 19/137* (2014.11); *H04N 19/176* (2014.11)

(58) Field of Classification Search
CPC ....... H04N 19/11; H04N 19/52; H04N 19/159
See application file for complete search history.

(56) References Cited

U.S. PATENT DOCUMENTS

| | | | |
|---|---|---|---|
| 11,895,291 B2* | 2/2024 | Su | H04N 19/70 |
| 2024/0031600 A1* | 1/2024 | Li | H04N 19/109 |
| 2025/0150604 A1* | 5/2025 | Zhang | H04N 19/159 |

OTHER PUBLICATIONS

Inter prediction and motion vector coding; Yang—2018. (Year: 2018).*
Algorithm description of Enhanced compression model; Cohan—Jan. 2024; (Year: 2024).*

* cited by examiner

*Primary Examiner* — Luis Perez-Fuentes
(74) *Attorney, Agent, or Firm* — ARENTFOX SCHIFF LLP

(57) ABSTRACT

Processing circuitry receives a coded video bitstream comprising coded information of a current block in a current picture, the coded information is indicative of an AMVP-merge mode, the AMVP-merge mode uses a bi-directional predictor including an AMVP predictor in a first direction and a merge predictor in a second direction. The processing circuitry constructs an AMVP candidate list that includes a plurality of AMVP candidates for the AMVP predictor and constructs a merge candidate list that includes a plurality of merge candidates for the merge predictor. The merge candidate list includes an SbTMVP candidate. The processing circuitry determines the AMVP predictor from the AMVP candidate list, determines the merge predictor from the merge candidate list, and reconstructs the current block according to a combination of a first prediction according to the AMVP predictor in the first direction and a second prediction according to the merge predictor in the second direction.

20 Claims, 7 Drawing Sheets

AMVP-MERGE MODE WITH SBTMVP

INCORPORATION BY REFERENCE

The present application claims the benefit of priority to U.S. Provisional Application No. 63/437,986, "AMVP-Merge Mode With SbTMVP" filed on Jan. 9, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a coded video bitstream comprising coded information of a current block in a current picture, the coded information is indicative of an advanced motion vector prediction-merge (AMVP-merge) mode, the AMVP-merge mode uses a bi-directional predictor including an AMVP predictor in a first direction and a merge predictor in a second direction that is different from the first direction. The processing circuitry constructs an AMVP candidate list that includes a plurality of AMVP candidates for the AMVP predictor and constructs a merge candidate list that includes a plurality of merge candidates for the merge predictor. The merge candidate list includes at least a subblock-based temporal motion vector prediction (SbTMVP) candidate. The processing circuitry determines the AMVP predictor from the AMVP candidate list, determines the merge predictor from the merge candidate list, and reconstructs the current block according to a combination of a first prediction according to the AMVP predictor in the first direction and a second prediction according to the merge predictor in the second direction.

In some examples, the merge predictor is determined to be the SbTMVP candidate. The processing circuitry determines, in a collocated picture for the current picture, a collocated block for the current block according to a displacement vector of the SbTMVP candidate, the current block includes a plurality of subblocks, and the collocated block includes a plurality of collocated subblocks respectively for the plurality of subblocks. The processing circuitry determines, a plurality of motion vectors respectively for the plurality of subblocks in the current block according to respective motion information of the plurality of collocated subblocks in the collocated block, and generates a plurality of reconstructed subblocks respectively for the plurality of subblocks in the current block according to the plurality of motion vectors respectively for the plurality of subblocks in the current block, the plurality of reconstructed subblocks form the second prediction.

In some examples, to construct the merge candidate list, the processing circuitry derives the SbTMVP candidate according to a motion vector of a spatial neighboring block of the current block. In an example, the processing circuitry determines a collocated block in a collocated picture for the current picture according to the motion vector of the spatial neighboring block of the current block, and in response to an available of subblock based motion information in the collocated block, uses the motion vector of the spatial neighboring block as a displacement vector (DV) for the SbTMVP candidate.

In an example, an availability of the subblock based motion information of the collocated block is determined based on an availability of a motion vector at a center subblock of the collocated block.

In another example, the availability of the subblock based motion information of the collocated block is determined based on an availability of a motion vector associated with the second direction at the center subblock of the collocated block.

In another example, an availability of the subblock based motion information of the collocated block is determined based on an availability of a motion vector associated with the second direction for at least one subblock in the collocated block.

In some examples, to derive the SbTMVP candidate, the processing circuitry checks a plurality of spatial neighboring blocks in a predefined order, and identifies a first spatial neighboring block with a first motion vector among the plurality of spatial neighboring blocks. A collocated block according to the first motion vector has available subblock based motion information. The processing circuitry uses the first motion vector as a displacement vector (DV) for the SbTMVP candidate.

In some examples, to construct the merge candidate list, zero displacement vector (DV) is used as the SbTMVP candidate in the merge candidate list. In an example, the processing circuitry checks a plurality of spatial neighboring blocks in a predefined order, determines that none of the plurality of spatial neighboring blocks has available subblock based motion information in a corresponding collocated block, and uses zero displacement vector (DV) for the SbTMVP candidate.

In some examples, to determine the plurality of motion vectors respectively for the plurality of subblocks in the current block, for a first subblock in the plurality of subblocks, in response to a lack of motion information in the second direction at a collocated subblock corresponding to the first subblock, the processing circuitry determines a first motion vector for the first subblock according to at least one of a second motion vector of a neighboring subblock of the first subblock that is in the second direction, a third motion vector of a center subblock of the collocated block that is in the second direction, and a default motion vector (e.g., zero DV).

In some examples, to determine the plurality of motion vectors respectively for the plurality of subblocks in the current block, the processing circuitry generates a binary mask for the plurality of subblocks in the current block, a binary bin in the binary mask for a subblock indicates an availability of a motion vector in the second direction.

In an example, in response to the binary bin for the subblock indicating that the motion vector in the second direction is available, a first reconstructed subblock is generated according to the AMVP predictor in the first direction, a second reconstructed subblock is reconstructed according to the motion vector in the second direction. The subblock is reconstructed based on a combination of the first reconstructed subblock and the second reconstructed subblock.

In another example, in response to the binary bin for the subblock indicating that the motion vector in the second direction is unavailable, uni-prediction is used for the subblock. For example, the processing circuitry generates a first reconstructed subblock in the first direction according to the AMVP predictor, and reconstructs the subblock based on the first reconstructed subblock.

In some examples, the merge candidate list includes the SbTMVP candidate, one or more spatial neighboring merge candidates, and one or more temporal neighboring merge candidates in a predefined order. In an example, the merge candidate list includes the SbTMVP candidate at a first position in the merge candidate list.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
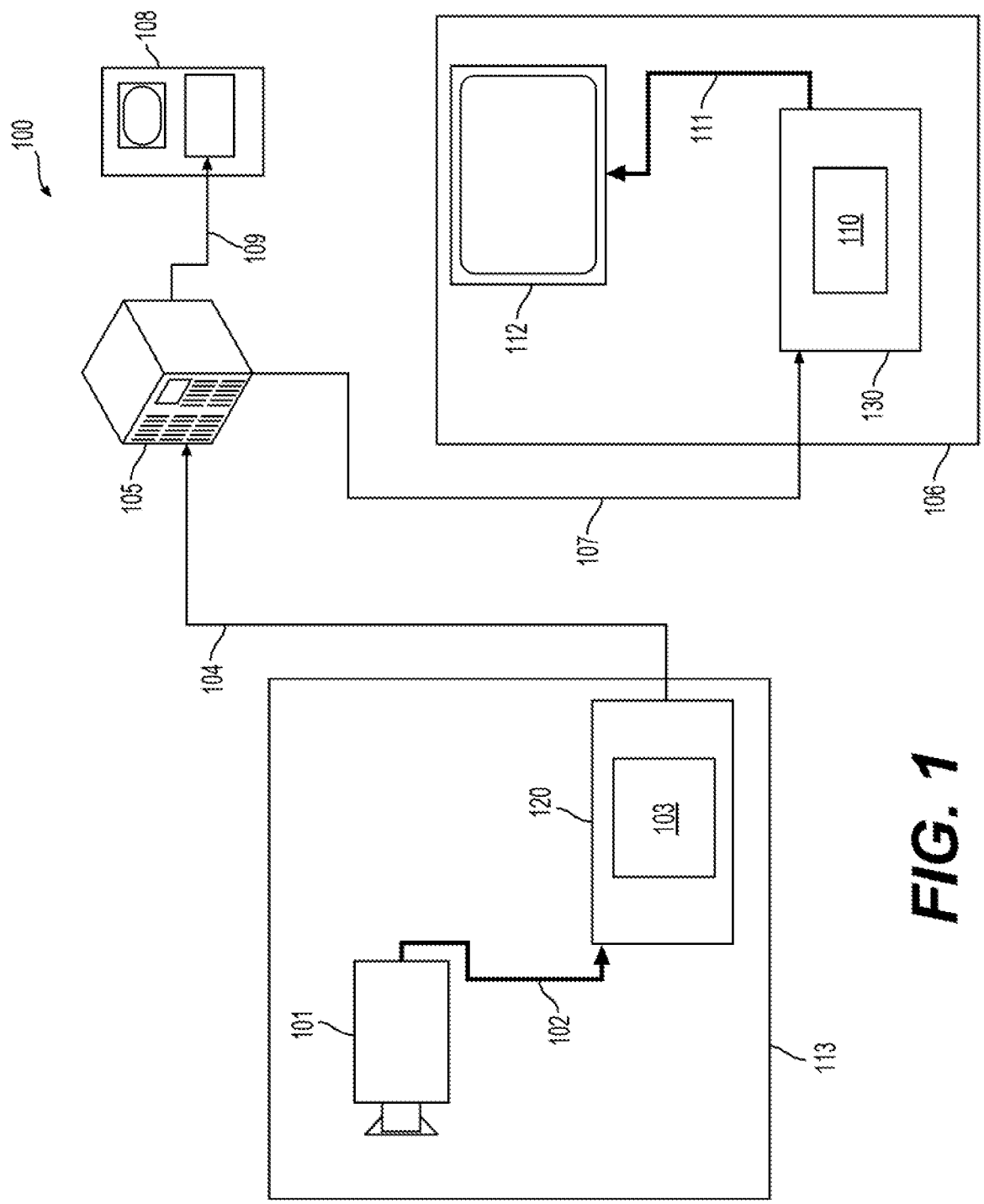
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
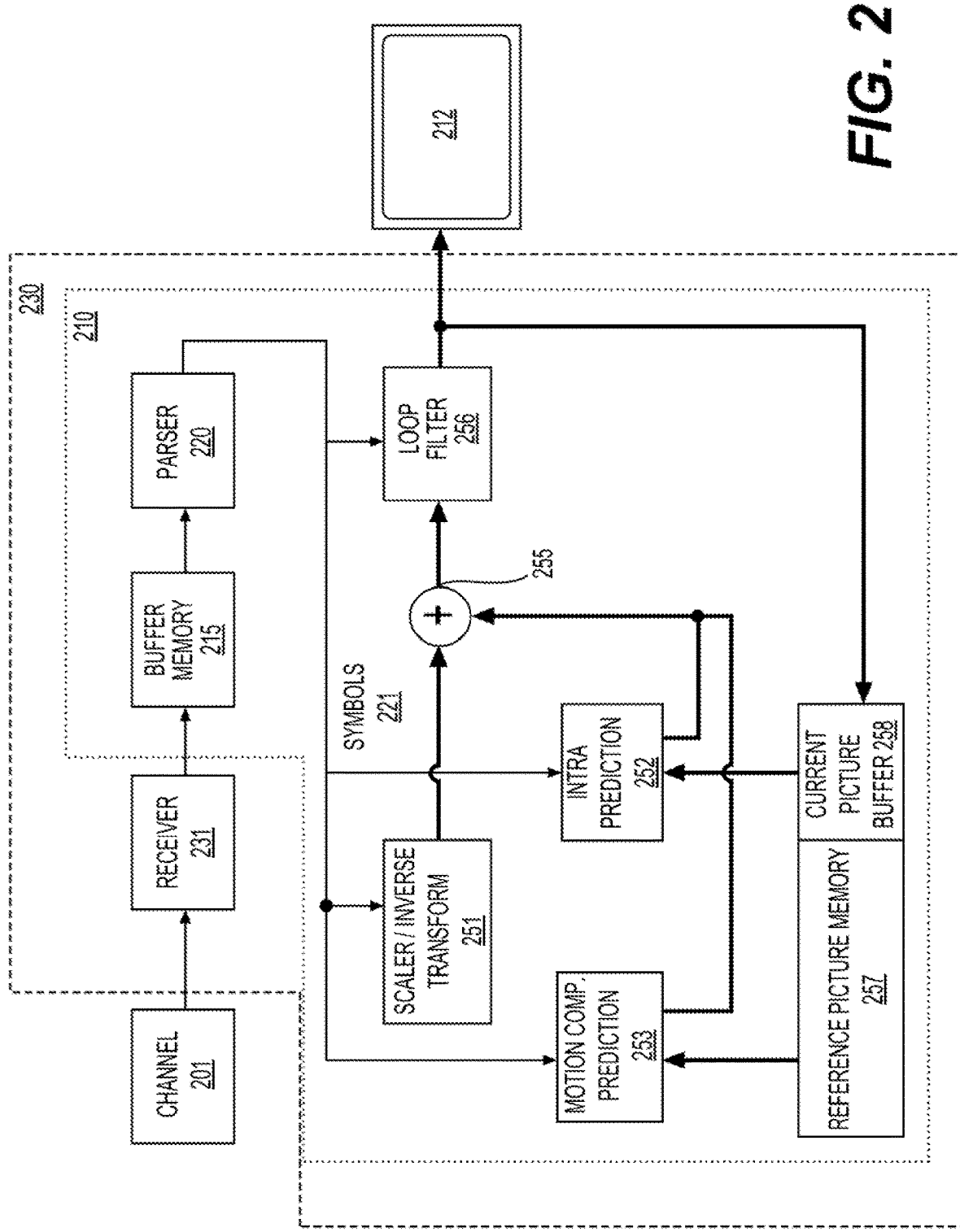
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
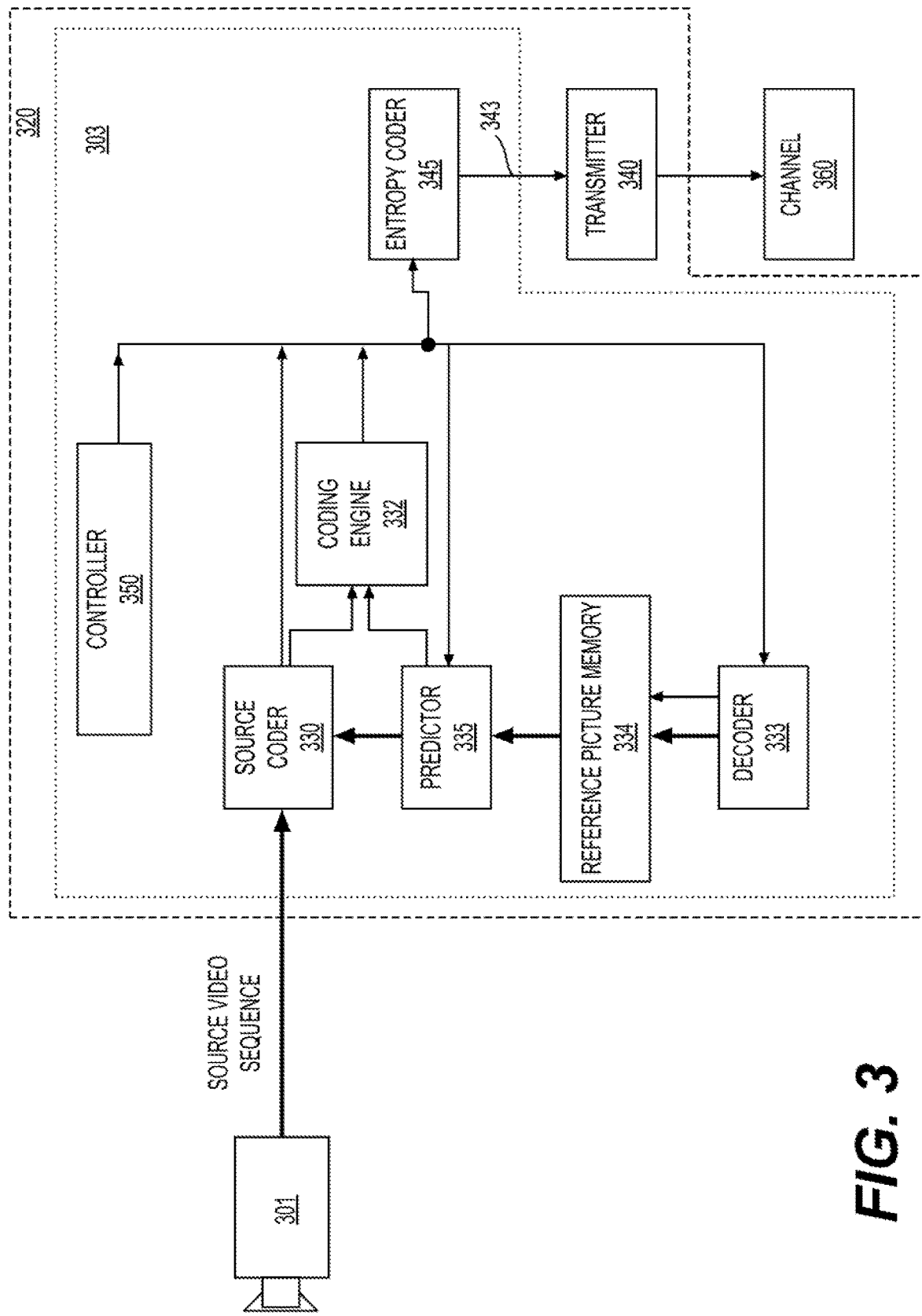
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs.

Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for a specific inter prediction mode that is referred to as advanced motion vector prediction (AMVP)-merge mode to use subblock-based temporal motion vector prediction (SbTMVP).

For example, various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Some inter predictions and related methods are described in details below.

Specifically, in some examples, in the merge mode, a video coder constructs a candidate list of motion parameters (e.g., reference pictures and motion vectors) using candidates from neighboring blocks, including spatial neighboring blocks and temporal neighboring blocks. In some examples, a maximum number of candidates is defined, such as 5, 7 and the like. In an example, the maximum number of candidates is five, and four of the candidates are from spatial neighboring blocks, and one of the candidates is from a temporal neighboring block. The chosen motion parameters are signaled from a video encoder to a video decoder by transmitting an index of a selected candidate from the candidate list. At the video decoder, once the index is decoded, the motion parameters of the corresponding neighboring block of the selected candidate are inherited to the current block. The video encoder and the video decoder are configured to construct the same lists based on already coded neighboring blocks. Therefore, based on the index, the video decoder can identify the motion parameters of the candidate selected by the video encoder.

It is noted that skip mode generally operates in the same manner described above for the merge mode, but in skip mode, no residual data is added to the predicted block, whereas in merge mode, residual data is added to the predicted block. The constructing of a list and transmitting of an index to identify a candidate in the list described above with reference to merge mode is generally also performed in skip mode. Some video codecs may treat skip mode as a separate mode from merge mode, while other video coding standards may treat skip mode as a special case of merge mode.

Another mode for predicting motion parameters is referred to as advanced motion vector prediction (AMVP) mode. In AMVP mode, a candidate list of motion vector predictors for each motion hypothesis is derived based on the coded reference index. The candidate list includes spatial motion vector predictors of neighboring blocks that are associated with the same reference index as well as a temporal motion vector predictor which is derived based on the motion parameters of the neighboring block of the co-located block in a temporal reference picture. In an example, the candidate list includes two motion vector predictors from spatial neighboring blocks in the same current picture as the current block, and one motion vector predictor from a temporal neighboring block in the temporal reference picture for the current picture. In an example, the chosen motion vector predictor is signaled by transmitting an index into the candidate list; and in addition, the reference indexes value and motion vector differences are also signaled. In another example, a template matching technique is used to select a motion vector predictor with a least template matching error; and further a decoder side motion vector refinement (DMVR) can be applied to the selected motion vector predictor. In some instances, the motion vector predictor and the motion vector used for inter prediction may be identical, while in other instances the motion vector predictor and the motion vector used for inter prediction may be different. In AMVP mode, for example, the motion vector used for inter prediction corresponds to a combination of the motion vector predictor and motion vector difference values.

In some examples (e.g., HEVC), AMVP can be used to predict the motion vector of current block by making use of spatial and temporal correlation of the neighboring partitions. At the encoder side, a rate distortion optimization (RDO) process is used to select the best motion vector predictor from a candidate list of candidates. Then, an index for the selected candidate is encoded and transmitted to the decoder. At the decoder side, the same candidate list as the encoder side can be constructed, for example in a defined manner. In some examples, the candidate list can be constructed by three steps. In the first step, the decoder obtains spatial and temporal motion vectors from a memory buffer to form the candidate list. In the second step, a redundancy checking process is utilized to remove the duplicated motion vectors from the candidate list. In the third step, a zero motion checking process is optionally employed to check the existence of zero motion in the candidate list. It is noted that the construction of the candidate list removes duplication motion vectors, and can shorten the candidate list, and less bits may be used to signal the index of selected candidate in the candidate list for AMVP.

It is noted that, for AMVP, in some examples, the encoder also signals a reference picture index to specify the reference picture to which the motion vector predictor specified by index of the selected candidate in the candidate list points. Additionally, for AMVP, the encoder can determine a motion vector difference (MVD) for the current block, the MVD is a difference between the motion vector predictor and a true motion vector or disparity motion vector that is used to perform an inter prediction of the current block. For AMVP, in addition to the reference picture index and the index of the selected candidate in the candidate list, the encoder also signals the MVD for the current block in the bitstream in some examples.

In some examples, in the candidate list of AMVP, the number of spatial neighboring candidates is limited not to exceed a threshold number, and the number of temporal candidates is limited not to exceed a threshold number. For example, in the candidate list of AMVP, there are at most two spatial neighboring candidates and one co-located temporal candidate. The potential AMVP spatial neighboring candidates are located at the bottom-left, left, above-right, above and above-left positions of the current block. The potential AMVP spatial neighboring candidates are categorized into two classes in an example. Left and bottom-left candidates are categorized in the first class while above-right, above and above-left candidates are categorized in the second class. In an example, a scanning order is used to put potential AMVP spatial neighboring candidates into the candidate list. For example, the scanning order is from the bottom to top in the first class and from the right to left in the second class respectively.

To improve the coding efficiency and reduce the transmission overhead of MV(s), a subblock level MV refinement can be applied to extend a CU level temporal motion vector prediction (TMVP). In an example, a subblock-based TMVP (SbTMVP) mode allows inheriting motion information at a subblock-level from a collocated reference picture. The collocated reference picture can be indicated by a reference index in a syntax, such as a high-level syntax (e.g., a picture header, a slice header). Each subblock of a plurality of subblocks in a current CU (e.g., a current CU with a large size) in a current picture can have respective motion information without explicitly transmitting a block partition structure or the respective motion information. In the SbTMVP mode, motion information for each subblock can be obtained as follows, for example, in three steps. In the first step, a displacement vector (DV) of the current CU can be derived. The DV can indicate a block in the collocated reference picture, for example, the DV points from the current block in the current picture to the block in the collocated reference picture. Thus, the block indicated by the DV is considered as being collocated with the current block and is referred to as a collocated block of the current block. In the second step, availability of an SbTMVP candidate can be checked and then a central motion (e.g., a central motion of the current CU) can be derived. In the third step, subblock motion information can be derived from a corresponding subblock in the collocated block using the DV. The three steps can be combined into one or two steps, and/or an order of the three steps may be adjusted.

Unlike TMVP candidate derivation which derives temporal MVs from a collocated block in a reference frame or a reference picture, in the SbTMVP mode, a DV (e.g., a DV derived from an MV of a left neighboring CU of the current CU) can be applied to locate a corresponding subblock in the collocated reference picture for each subblock in the current CU that is in the current picture. In some examples, when the corresponding subblock is not inter-coded, motion information of the current subblock can be set to be the central motion of the collocated block.

The SbTMVP mode can be supported by various video coding standards including for example VVC. Similar to the TMVP mode, for example, in HEVC, in the SbTMVP mode, a motion field (also referred to as a motion information field or an MV field) in the collocated reference picture can be used to improve MV prediction and a merge mode for CUs in the current picture. In an example, the same collocated reference picture used by the TMVP mode is used in the SbTMVP mode. In an example, the SbTMVP mode differs from the TMVP mode in the following aspects: (i) the TMVP mode predicts motion information at the CU level while the SbTMVP mode predicts motion information at a sub-CU level; (ii) the TMVP mode fetches the temporal MVs from the collocated block in the collocated reference picture (e.g., the collocated block is the bottom-right or a center block relative to the current CU) while the SbTMVP mode can apply a motion shift before fetching the temporal motion information from the collocated reference picture. In an example, the motion shift used in the SbTMVP mode is obtained from an MV of one of spatial neighboring blocks of the current CU.

Figure 4:
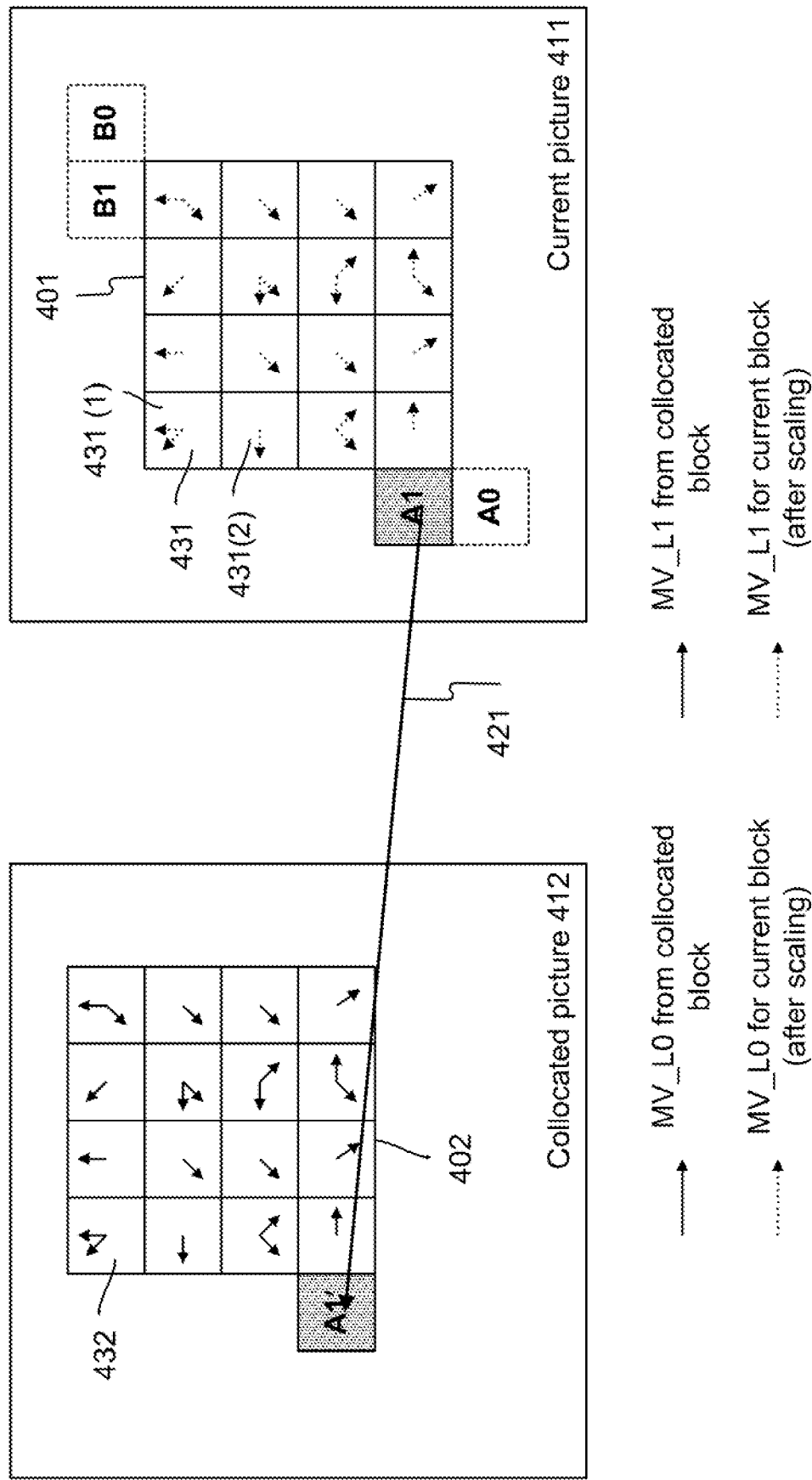
FIG. 4 shows a subblock-based temporal motion vector prediction (SbTMVP) process used in the SbTMVP mode in some examples.

FIG. 4 shows an SbTMVP process used in the SbTMVP mode. The SbTMVP process can predict MVs of sub-CUs (e.g., subblocks) within a current CU (e.g., a current block) (401) in a current picture (411), for example, in two steps. In the first step, a spatial neighbor (e.g., A1) of the current block (401) in FIG. 4 is examined. If the spatial neighbor (e.g., A1) has an MV (421) that uses a collocated reference picture (412) as a reference picture of the spatial neighbor (e.g., A1), the MV (421) can be selected to be a motion shift (or a DV) to be applied to the current block (401). If no such MV (e.g., an MV that uses the collocated reference picture (412) as a reference picture) is identified, the motion shift or the DV can be set to a zero MV (e.g., (0, 0)). In some examples, MV(s) of additional spatial neighbors, such as A0, B0, B1, and the like are checked if no such MV is identified for the spatial neighbor A1.

In the second step, the motion shift or the DV (421) identified in the first step can be applied to the current block (401) (e.g., the DV (421) is added to coordinates of the current block) to obtain sub-CU level motion information (e.g., including MVs and reference indices) from the collocated reference picture (412). In the example shown in FIG. 4, the motion shift or the DV (421) is set to be the MV of the spatial neighbor A1 (e.g., a block A1) of the current block (401). Motion information of subblocks in a corresponding collocated block (402) in the collocated reference picture (412) can be used to derive the motion information for the sub-CUs or subblocks (431) in the current picture (411). For example, after the motion information of a collocated sub-CU (432) in the collocated block (402) is identified, the motion information of the collocated sub-CU (432) can be converted to the motion information (e.g., MV(s) and one or more reference indices) of the current sub-CU (431), for example, using a scaling method, such as in a similar way as the TMVP process used in HEVC, where temporal motion scaling is applied to align reference pictures of temporal MVs to reference pictures of a current CU.

The motion field of the current block (401) derived based on the DV (421) can include motion information of each subblock (431) in the current block (401), such as MV(s) and one or more associated reference indices. The motion field of the current block (401) can also be referred to as an SbTMVP candidate and corresponds to the DV (421).

For example, the motion information of the subblock (431(1)) that is bi-predicted includes a first MV, a first index indicating a first reference picture in a reference picture list 0 (L0), a second MV and a second index indicating a second reference picture in a reference picture list 1 (L1). In an example, the motion information of the subblock (431(2)) that is uni-predicted includes an MV and an index indicating a reference picture in L0 or L1.

In an example, the DV (421) is applied to a central position of the current block (401) to locate a displaced central position in the collocated reference picture (412). If a block including the displaced central position is not inter-coded, the SbTMVP candidate is considered not available. Otherwise, if a block (e.g., the collocated block (402)) including the displaced central position is inter-coded, the motion information of the central position of the current block (401), referred to as central motion of the current block (401), can be derived from motion information of the collocated block (402) including the displaced central position in the collocated reference picture (412). In an example, a scaling process can be used to derive the central motion of the current block (401) from the motion information of the collocated block (402) including the displaced central position in the collocated reference picture (412). When the SbTMVP candidate is available, the DV (421) can be applied to find the corresponding subblock (432) in the collocated reference picture (412) for each subblock (431) of the current block (401). The motion information of the corresponding subblock (432) can be used to derive the motion information of the subblock (431) in the current block (401), such as in the same way used to derive the central motion of the current block (401). In an example, if the corresponding subblock (432) is not inter-coded, the motion information of the current subblock (431) is set to be the central motion of the current block (401).

In some examples, such as in VVC, a combined subblock based merge list which includes an SbTMVP candidate and affine merge candidate(s) is used in the signaling of a subblock based merge mode. The SbTMVP mode can be enabled or disabled by a sequence parameter set (SPS) flag. If the SbTMVP mode is enabled, the SbTMVP candidate (or the SbTMVP predictor) can be added as the first entry of the subblock based merge list including subblock based merge candidates, and followed by the affine merge candidate(s). The size of the subblock based merge list can be signaled in the SPS. In an example, the maximum allowed size of the subblock based merge list is 5 in VVC. In an example, multiple SbTMVP candidates are included in the subblock based merge list.

In some examples, such as in VVC, the sub-CU size used in the SbTMVP mode is fixed to be 8×8, such as used for the affine merge mode. In an example, the SbTMVP mode is only applicable to a CU with both a width and a height being larger than or equal to 8. The subblock size (e.g., 8×8) may be configurable to other sizes, such as 4×4 in an ECM software model use for exploration beyond VVC. In an example, multiple collocated reference pictures, such as two collocated frames, are utilized to provide temporal motion information for the SbTMVP and/or the TMVP.

In some examples, a specific prediction mode that is referred to as AMVP-merge mode is used for bi-prediction. A bi-directional predictor of the AMVP-merge mode includes an AMVP predictor in one direction and a merge predictor in the other direction. In some examples, the AMVP-merge mode can be enabled to a coding block when the selected merge predictor and AMVP predictor satisfy DMVR conditions, where there is at least one reference picture from the past and one reference picture from the future relatively to the current picture and the distances from two reference pictures to the current picture are the same, the bilateral matching MV refinement is applied for the merge MV candidate (e.g., merge predicator) and AMVP MVP (e.g., AMVP predictor) that are used as a starting point. Otherwise, if template matching functionality is enabled, template matching MV refinement is applied to the merge predictor or the AMVP predictor which has a higher template matching cost.

In some examples, AMVP part of the mode is signaled as a regular uni-directional AMVP, for example with reference index and MVD being signaled. In some examples, the AMVP part can have a derived MVP index (e.g., an index to indicate the selected AMVP predictor) when template matching is used or the MVP index is signaled when template matching is disabled.

In some examples, AMVP direction is represented by LX, X can be 0 or 1, the merge part in the other direction (1-LX) is implicitly derived by minimizing the bilateral matching cost between the AMVP predictor and a merge predictor, i.e., for a pair of the AMVP and a merge motion vectors (e.g., bilateral matching costs of the AMVP predictor and respective merge candidates are calculated). For every merge candidate in the merge candidate list which has that other direction (1-LX) motion vector, the bilateral matching cost is calculated using the merge candidate MV and the AMVP MV. The merge candidate with the smallest bilateral matching cost is selected. Further, the bilateral matching refinement can be applied to the coding block with the selected merge candidate MV and the AMVP MV being used as a starting point.

In some examples, the third pass of multi-pass DMVR which is 8×8 sub-PU BDOF refinement of the multi-pass DMVR is enabled to AMVP-merge mode coded block. In an example, the multi-pass DMVR includes a first pass that performs block based bilateral matching MV refinement. Further, the multi-pass DMVR includes a second pass that performs subblock based bilateral matching MV refinement. The multi-pass DMVR also includes the third pass that performs subblock based bi-directional optical flow MV refinement. In the third pass, a refined MV is derived by applying BDOF to 8×8 grid subblock.

In some examples, the AMVP-merge mode can be indicated by a flag. When the AMVP-merge mode is enabled, in an example, the AMVP direction LX is further indicated by a flag.

In some examples, when bilateral matching (BM) AMVP-merge mode is used for the current block and template matching is enabled, MVD is not signaled. In an example, an additional pair of AMVP-merge MVPs is introduced. The merge candidate list is sorted based on the BM cost in an increase order. An index (0 or 1) is signaled to indicate which merge candidate in the sorted merge candidate list to use. When there is only one candidate in the merge candidate list, the pair of AMVP MVP and merge MVP without bilateral matching MV refinement is padded.

In some examples, for bi-directional prediction, a first prediction of the current block is based on motion information in the first direction, and a second prediction of the current block is based on motion information in the second direction. Then, a bi-directional prediction of the current block is a combination of the first prediction and the second prediction, such as an average of the first prediction and the second prediction, a weighted sum of the first prediction and the second prediction and the like. In some examples, for a current block in the AMVP-merge mode, a bi-directional predictor of the AMVP-merge mode is used for coding the current block. The bi-directional predictor includes an AMVP predictor in one direction (e.g., a first direction), and a merge predictor in the other direction (e.g., a second direction). Then, a first prediction of the current block is based on the AMVP predictor in the first direction, and a second prediction of the current block is based on the merge predictor in the second direction. A bi-directional prediction of the current block in the AMVP-merge mode is a combination of the first prediction and the second prediction, such as an average of the first prediction and the second prediction, a weighted sum of the first prediction and the second prediction and the like.

According to an aspect of the disclosure, in some examples, such as in ECM, AMVP-Merge mode is used to combine one uni-predictor from AMVP mode at one reference list and another one uni-predictor from merge candidate at another reference list to form the final bi-predictor. However, the subblock-level temporal motion vector is not used as merge candidate in AMVP-merge mode.

Some aspects of the disclosure provide techniques to allow the subblock-level temporal motion vector, such as SbTMVP, to be used as merge candidate in AMVP-merge mode, thus motion field information can be more accurate. Thus, the coding gain of the AMVP-merge mode can be improved by considering SbTMVP in AMVP-merge mode. For example, encoder/decoder can construct an AMVP candidate list that includes a plurality of AMVP candidates for the AMVP predictor; and construct a merge candidate list that includes a plurality of merge candidates for the merge predictor, the merge candidate list includes an SbTMVP candidate. Then, encoder/decoder can select the AMVP predictor from the AMVP candidate list, select the merge predictor from the merge candidate list, and reconstruct the current block according to a combination of a first prediction according to the AMVP predictor in the first direction and a second prediction according to the merge predictor in the second direction.

According to some aspects of the disclosure, an SbTMVP candidate can be added into the merge candidate list during the merge list construction in AMVP-merge mode.

In some embodiments, the derivation of the added SbTMVP candidate is the same as the SbTMVP derivation in subblock merge list. For example, the SbTMVP process that is described with reference to FIG. 4 is used to derive the SbTMVP candidate according to a spatial neighboring block, and the derived SbTMVP candidate is added into the merge candidate list. In an example, as shown in FIG. 4, the left neighbor A1 is inter coded and has the MV (421). The MV (421) is used as DV (421). In an example, the DV (421) is applied to a central position of the current block (401) to locate a displaced central position in the collocated reference picture (412). When a block (e.g., the collocated block (402), a subblock at the center of the collocated block (402)) including the displaced central position is inter-coded, the motion information of the central position of the current block (401), referred to as central motion of the current block (401), can be derived from, for example, motion information of the displaced central position in the collocated block (402) (e.g., a center subblock of the collocated block (402)). The motion field of the current block (401) derived based on the DV (421) can include motion information of each subblock (431) in the current block (401), such as MV(s) and one or more associated reference indices. The motion field of the current block (401) can also be referred to as an SbTMVP candidate and corresponds to the DV (421). However, in an example, when motion information at the displaced central position in the collocated block (402) is not available, SbTMVP candidate corresponding to the DV (421) is considered not available.

In some embodiments, not like VVC, the left neighbor coded block is used for SbTMVP derivation, zero displacement vector (DV) is used to derive the SbTMVP at the collocated position in the collocated picture. If the collocated center subblock motion vector in the collocated picture is not available, the SbTMVP candidate is also not available during merge list construction. In an example, an SbTMVP with zero DV is added into the merge candidate list. In another example, an SbTMVP with zero DV is added into the merge candidate list under certain conditions. For example, when the SbTMVP candidate according to the motion information of a spatial neighboring block is considered not available, then the zero DV, such as (0,0) is used to derive the SbTMVP candidate at the collocated position in the collocated reference picture. When an SbTMVP candidate with the zero DV is available, the SbTMVP candidate with zero DV can be added into the merge candidate list.

In some examples, multiple SbTMVP candidates can be added into the merge candidate list. For example, a SbTMVP candidate list that includes a first SbTMVP candidate with a DV derived from motion information of a spatial neighboring block, and a second SbTMVP candidate with zero DV.

In some embodiments, not only the left neighbor coded block is used for SbTMVP derivation in VVC, a predefined order of multiple spatial neighbor coded blocks is used one by one to check the availability of the SbTMVP. If the center subblock motion vectors of all spatial neighbor coded blocks are not available, zero DV is used to derive the SbTMVP. In some examples, spatial neighboring blocks, such as A1, A0, B1 and B0 in FIG. 4 are checked in a predefined order to determine the availability of a SbTMVP candidate with a DV derived from motion information of one of the spatial neighboring blocks. When SbTMVP candidate is not available by any of the spatial neighboring blocks, a SbTMVP candidate with zero DV is added into the merge candidate list.

In some embodiments, for AMVP direction LX and merge direction (1-LX), only the center subblock motion vector which has that direction (1-LX) motion vector could be marked as "available" during the SbTMVP derivation. In some other examples, each subblock is checked whether it has a SbTMVP candidate with MV associated with direction (1-LX), if none of the subblock has a SbTMVP candidate with MV associated with direction (1-LX), then SbTMVP is not allowed to be applied on AMVP-merge mode, and related signaling is not applied. For example, when the motion vector of the center subblock of a collocated block has direction (1-LX) (e.g., the reference picture for the motion vector is in the direction (1-LX)), the motion information of the center subblock of the collocated block is considered available for SbTMVP derivation. In some examples, each subblock in the collocated block is checked to determine whether one of the subblocks in the collocated block has motion vector in the direction (1-LX). When at least one of the subblocks has motion vector in the direction (1-LX), then the collocated block is used to derive SbTMVP candidate with motion information in the direction (1-LX). When none of the subblocks in the collocated block has motion vector in the direction (1-LX), then in an example, no SbTMVP candidate is used in the AMVP-merge mode.

In some embodiments, for each subblock, when doing motion compensation, if the associated subblock motion vector does not have a MV for direction (1-LX), then an MV from a neighboring subblock with associated reference (1-LX) is used for this subblock, center subblock with associated reference (1-LX) is used for this subblock, or a default MV (0, 0) is used for this subblock. In some examples of motion compensation using the SbTMVP candidate, for a subblock in the current block, when the collocated subblock according to the SbTMVP candidate does not have motion vector for the direction (1-LX) (also referred to as with reference (1-LX)), a substitute motion vector for the direction (1-LX) is suitably determined for the subblock. In an example, neighboring subblocks of the collocated block can be checked to find a motion vector for the direction (1-LX) as the substitute motion vector. In another example, the motion vector of the center subblock for the direction (1-LX) is used as the substitute motion vector. In another example, a default motion vector, such as (0,0) is used as the substitute motion vector.

In some embodiments, a binary mask is derived based on the availability of the MV for each subblock at reference direction (1-LX). For each subblock, the mask at the associated position is marked as true, if the subblock MV at reference direction 1-LX is available, otherwise, the mask at the associated position is marked as false. During the motion compensation of AMVP-merge mode by using SbTMVP, this mask is used to decide whether the uni-prediction at 1-LX for each subblock is available. When associated value in the mask at the subblock is true, bi-prediction with uni-prediction at LX from AMVP and uni-prediction at 1-LX from SbTMVP is applied, otherwise, only the uni-prediction at LX in AMVP is used.

For example, for a current block that includes 4 subblocks (e.g., arranged in 2×2), a 2×2 binary mask is derived, and each binary bin corresponds to a subblock, and indicates the availability of MV at the reference direction (1-LX). During the motion compensation of AMVP-merge mode by using the SbTMVP candidate, the 2×2 binary mask is used to decide whether the uni-prediction at the reference direction (1-LX) for each subblock is available. When a binary bin in the binary mask corresponding to a subblock is true, bi-prediction with a first uni-prediction at reference direction (LX) from the AMVP predictor and a second uni-prediction at the reference direction (1-LX) from the SbTMVP candidate can be applied to reconstruct the subblock. When a binary bin in the binary mask corresponding to a subblock is false, the subblock is reconstructed based on the uni-prediction at the reference direction LX from the AMVP predictor.

In some embodiments, the SbTMVP candidate is derived in a predefined order during merge list construction in AMVP-merge mode. For example, during the merge candidate list construction, the SbTMVP candidate, the regular spatial merge candidates and the temporal merge candidate are derived and placed in the merge candidate list in a predefined order. In an example, the predefined order is the SbTMVP candidate, the regular spatial merge candidates and the temporal merge candidate. In another example, the predefined order is the regular spatial merge candidates, the SbTMVP candidate and the temporal merge candidate.

In some embodiments, the SbTMVP candidate may be derived at first when there is at least one SbTMVP mode is used in the spatial neighbor coded blocks during merge list construction in AMVP-merge mode. For example, when one of the spatial neighboring blocks is coded in the SbTMVP mode, an SbTMVP candidate is derived first and placed at the first position in the merge candidate list.

Figure 5:
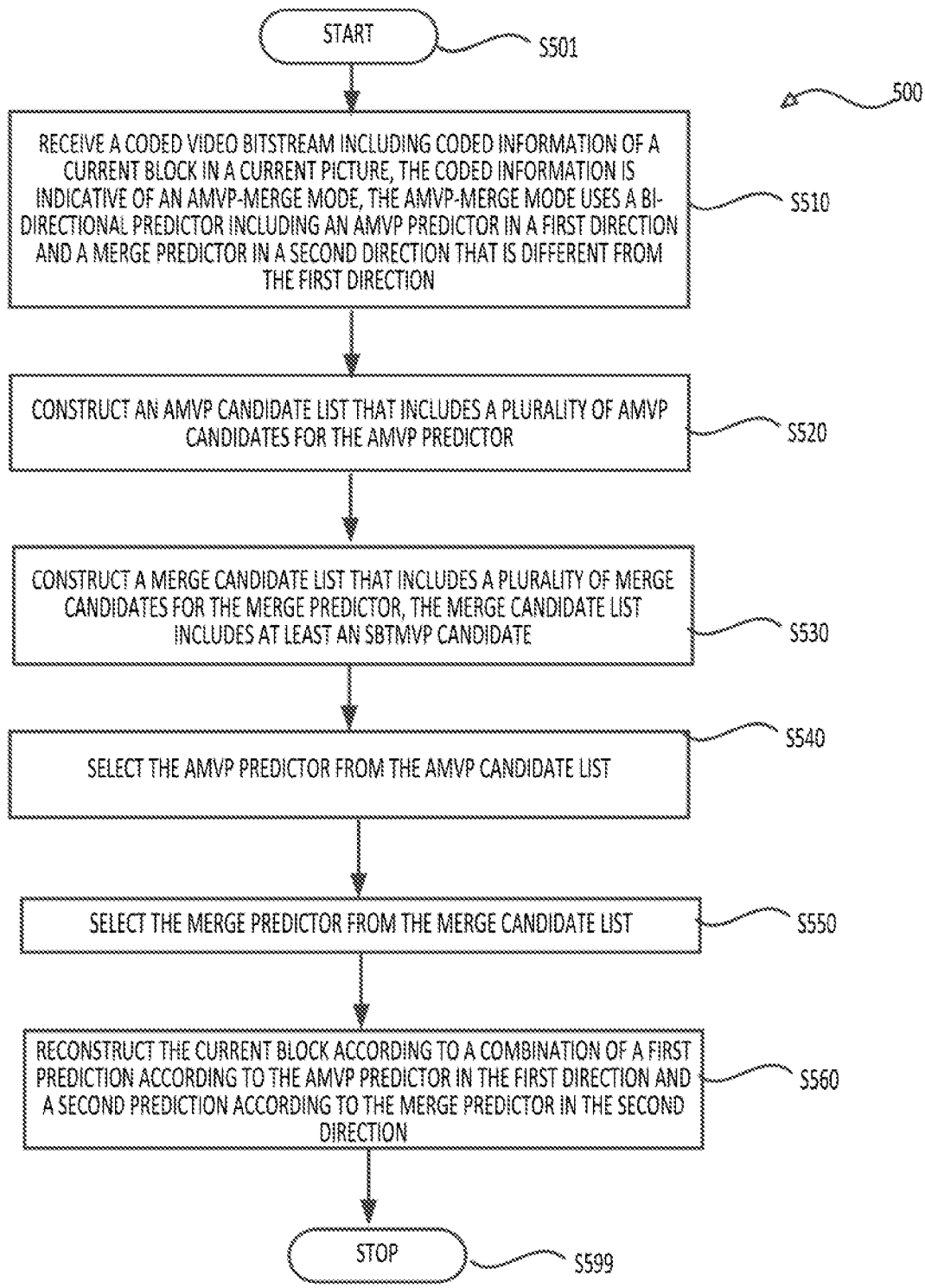
FIG. 5 shows a flow chart outlining another process according to some embodiment of the disclosure.

FIG. 5 shows a flow chart outlining a process (500) according to an embodiment of the disclosure. The process (500) can be used in a video decoder. In various embodiments, the process (500) is executed by processing circuitry, such as the processing circuitry that performs functions of the video decoder (110), the processing circuitry that performs functions of the video decoder (210), and the like. In some embodiments, the process (500) is implemented in software instructions, thus when the processing circuitry executes the software instructions, the processing circuitry performs the process (500). The process starts at (S501) and proceeds to (S510).

At (S510), coded information of a current block in a current picture is received from a coded video bitstream. The coded information is indicative of an AMVP-merge mode, the AMVP-merge mode uses a bi-directional predictor including an AMVP predictor in a first direction and a merge predictor in a second direction that is different from the first direction.

At (S520), an AMVP candidate list that includes a plurality of AMVP candidates for the AMVP predictor is constructed.

At (S530), a merge candidate list that includes a plurality of merge candidates for the merge predictor is constructed. The merge candidate list includes at least an SbTMVP candidate.

At (S540), the AMVP predictor is selected from the AMVP candidate list.

At (S550), the merge predictor is selected from the merge candidate list.

At (S560), the current block is reconstructed according to a combination of a first prediction according to the AMVP predictor in the first direction and a second prediction according to the merge predictor in the second direction.

In some examples, the merge predictor is determined to be the SbTMVP candidate. To reconstruct the current block, in a collocated picture for the current picture, a collocated block for the current block is determined according to a displacement vector of the SbTMVP candidate, the current block includes a plurality of subblocks, and the collocated block includes a plurality of collocated subblocks respectively for the plurality of subblocks. A plurality of motion vectors respectively for the plurality of subblocks in the current block are determined according to respective motion information of the plurality of collocated subblocks in the collocated block. A plurality of reconstructed subblocks respectively for the plurality of subblocks in the current block are reconstructed according to the plurality of motion vectors respectively for the plurality of subblocks in the current block. The plurality of reconstructed subblocks form the second prediction.

In some examples, to construct the merge candidate list, the SbTMVP candidate is derived according to a motion vector of a spatial neighboring block of the current block. In an example, a collocated block in a collocated picture for the current picture is determined according to the motion vector of the spatial neighboring block of the current block. In response to an available of subblock based motion information in the collocated block, the motion vector of the spatial neighboring block is used as a displacement vector (DV) for the SbTMVP candidate. In an example, an availability of the subblock based motion information of the collocated block is determined based on an availability of a motion vector at a center subblock of the collocated block. In another example, the availability of the subblock based motion information of the collocated block is determined based on an availability of a motion vector associated with the second direction at the center subblock of the collocated block. In another example, an availability of the subblock based motion information of the collocated block is determined based on an availability of a motion vector associated with the second direction for at least one subblock in the collocated block.

In some examples, to derive the SbTMVP candidate, a plurality of spatial neighboring blocks are checked in a predefined order. A first spatial neighboring block with a first motion vector is identified among the plurality of spatial neighboring blocks, a collocated block according to the first motion vector has available subblock based motion information. The first motion vector is used as a displacement vector (DV) for the SbTMVP candidate.

In some examples, to construct the merge candidate list, zero displacement vector (DV) (e.g., (0,0)) is used as the SbTMVP candidate. In an example, a plurality of spatial neighboring blocks in a predefined order. When none of the plurality of spatial neighboring blocks has available subblock based motion information in a corresponding collocated block, zero displacement vector (DV) us used for the SbTMVP candidate.

In some examples, to determine the plurality of motion vectors respectively for the plurality of subblocks in the current block, for a first subblock in the plurality of subblocks, in response to a lack of motion information in the second direction at a collocated subblock corresponding to the first subblock, a first motion vector for the first subblock is determined according to a second motion vector of a neighboring subblock of the first subblock that is in the second direction. In another example, a first motion vector for the first subblock is determined according a third motion vector of a center subblock of the collocated block that is in the second direction. In another example, a first motion vector for the first subblock is set according to a default motion vector.

In some examples, to determine the plurality of motion vectors respectively for the plurality of subblocks in the current block, a binary mask for the plurality of subblocks in the current block is generated. The binary mask includes binary bins associated with the plurality of subblocks in the current block. A binary bin in the binary mask for a subblock indicates an availability of a motion vector in the second direction.

In an example, in response to the binary bin for the subblock indicates that the motion vector in the second direction is available, a first reconstructed subblock is reconstructed according to the AMVP predictor in the first direction, a second reconstructed subblock is reconstructed according to the motion vector in the second direction. The subblock is reconstructed based on a combination of the first reconstructed subblock and the second reconstructed subblock.

In another example, in response to the binary bin for the subblock indicating that the motion vector in the second direction is unavailable, uni-prediction is used to reconstruct the subblock. For example, a first reconstructed subblock is generated according to the AMVP predictor in the first direction, the subblock is reconstructed based on the first reconstructed subblock.

In some examples, the merge candidate list includes the SbTMVP candidate, one or more spatial neighboring merge candidates, and one or more temporal neighboring merge candidates in a predefined order. In an example, the merge candidate list includes the SbTMVP candidate at a first position in the merge candidate list.

Then, the process proceeds to (S599) and terminates.

The process (500) can be suitably adapted. Step(s) in the process (500) can be modified and/or omitted. Additional step(s) can be added. Any suitable order of implementation can be used.

Figure 6:
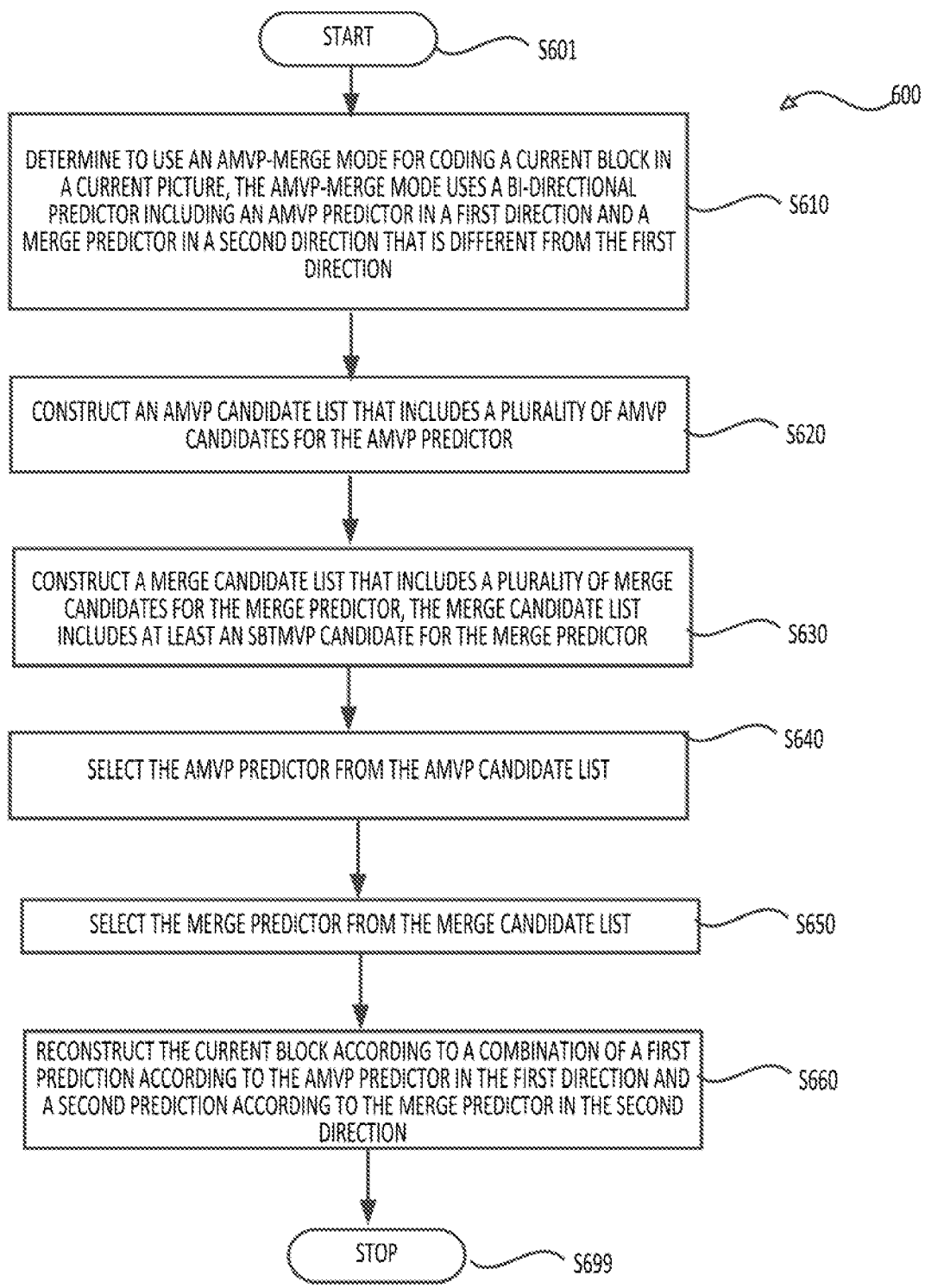
FIG. 6 shows a flow chart outlining a process according to some embodiment of the disclosure.

FIG. 6 shows a flow chart outlining a process (600) according to an embodiment of the disclosure. The process (600) can be used in a video encoder. In various embodiments, the process (600) is executed by processing circuitry, such as the processing circuitry that performs functions of the video encoder (103), the processing circuitry that performs functions of the video encoder (303), and the like. In some embodiments, the process (600) is implemented in software instructions, thus when the processing circuitry executes the software instructions, the processing circuitry performs the process (600). The process starts at (S601) and proceeds to (S610).

At (S610), to use an AMVP-merge mode for coding a current block in a current picture is determined. The AMVP-merge mode uses a bi-directional predictor including an AMVP predictor in a first direction and a merge predictor in a second direction that is different from the first direction.

At (S620), an AMVP candidate list that includes a plurality of AMVP candidates for the AMVP predictor is constructed.

At (S630), a merge candidate list that includes a plurality of merge candidates for the merge predictor is constructed. The merge candidate list includes at least a subblock-based temporal motion vector prediction (SbTMVP) candidate for the merge predictor.

At (S640), the AMVP predictor is selected from the AMVP candidate list.

At (S650), the merge predictor is selected from the merge candidate list.

At (S660), the current block is reconstructed according to a combination of a first prediction according to the AMVP predictor in the first direction and a second prediction according to the merge predictor in the second direction.

In some examples, the merge predictor is determined to be the SbTMVP candidate. To reconstruct the current block, in a collocated picture for the current picture, a collocated block for the current block is determined according to a displacement vector of the SbTMVP candidate, the current block includes a plurality of subblocks, and the collocated block includes a plurality of collocated subblocks respectively for the plurality of subblocks. A plurality of motion vectors respectively for the plurality of subblocks in the current block are determined according to respective motion information of the plurality of collocated subblocks in the collocated block. A plurality of reconstructed subblocks respectively for the plurality of subblocks in the current block are reconstructed according to the plurality of motion vectors respectively for the plurality of subblocks in the current block. The plurality of reconstructed subblocks form the second prediction.

In some examples, to construct the merge candidate list, the SbTMVP candidate is derived according to a motion vector of a spatial neighboring block of the current block. In an example, a collocated block in a collocated picture for the current picture is determined according to the motion vector of the spatial neighboring block of the current block. In response to an available of subblock based motion information in the collocated block, the motion vector of the spatial neighboring block is used as a displacement vector (DV) for the SbTMVP candidate. In an example, an availability of the subblock based motion information of the collocated block is determined based on an availability of a motion vector at a center subblock of the collocated block. In another example, the availability of the subblock based motion information of the collocated block is determined based on an availability of a motion vector associated with the second direction at the center subblock of the collocated block. In another example, an availability of the subblock based motion information of the collocated block is determined based on an availability of a motion vector associated with the second direction for at least one subblock in the collocated block.

In some examples, to derive the SbTMVP candidate, a plurality of spatial neighboring blocks are checked in a predefined order. A first spatial neighboring block with a first motion vector is identified among the plurality of spatial neighboring blocks, a collocated block according to the first motion vector has available subblock based motion information. The first motion vector is used as a displacement vector (DV) for the SbTMVP candidate.

In some examples, to construct the merge candidate list, zero displacement vector (DV) (e.g., (0,0)) is used as the SbTMVP candidate. In an example, a plurality of spatial neighboring blocks in a predefined order. When none of the plurality of spatial neighboring blocks has available subblock based motion information in a corresponding collocated block, zero displacement vector (DV) us used for the SbTMVP candidate.

In some examples, to determine the plurality of motion vectors respectively for the plurality of subblocks in the current block, for a first subblock in the plurality of subblocks, in response to a lack of motion information in the second direction at a collocated subblock corresponding to the first subblock, a first motion vector for the first subblock is determined according to a second motion vector of a neighboring subblock of the first subblock that is in the second direction. In another example, a first motion vector for the first subblock is determined according a third motion vector of a center subblock of the collocated block that is in the second direction. In another example, a first motion vector for the first subblock is set according to a default motion vector.

In some examples, to determine the plurality of motion vectors respectively for the plurality of subblocks in the current block, a binary mask for the plurality of subblocks in the current block is generated. The binary mask includes binary bins associated with the plurality of subblocks in the current block. A binary bin in the binary mask for a subblock indicates an availability of a motion vector in the second direction.

In an example, in response to the binary bin for the subblock indicates that the motion vector in the second direction is available, a first reconstructed subblock is reconstructed according to the AMVP predictor in the first direction, a second reconstructed subblock is reconstructed according to the motion vector in the second direction. The subblock is reconstructed based on a combination of the first reconstructed subblock and the second reconstructed subblock.

In another example, in response to the binary bin for the subblock indicating that the motion vector in the second direction is unavailable, uni-prediction is used to reconstruct the subblock. For example, a first reconstructed subblock is generated according to the AMVP predictor in the first direction, the subblock is reconstructed based on the first reconstructed subblock.

In some examples, the merge candidate list includes the SbTMVP candidate, one or more spatial neighboring merge candidates, and one or more temporal neighboring merge candidates in a predefined order. In an example, the merge candidate list includes the SbTMVP candidate at a first position in the merge candidate list.

Then, the process proceeds to (S699) and terminates.

The process (600) can be suitably adapted. Step(s) in the process (600) can be modified and/or omitted. Additional step(s) can be added. Any suitable order of implementation can be used.

The techniques described above, can be implemented as computer software using computer-readable instructions and physically stored in one or more computer-readable media. For example, FIG. 7 shows a computer system (700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
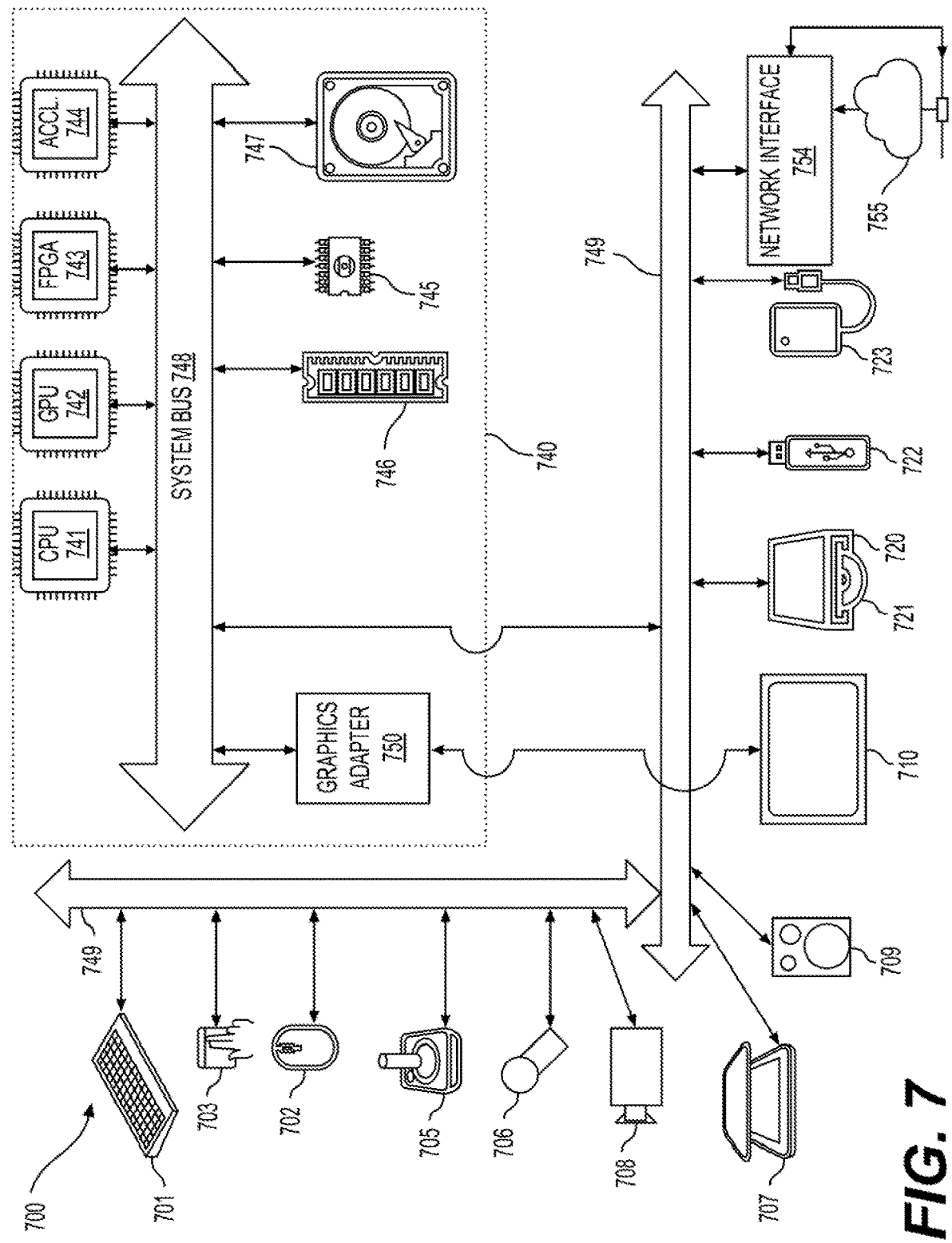
FIG. 7 is a schematic illustration of a computer system in accordance with an embodiment.

The components shown in FIG. 7 for computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving a coded video bitstream comprising coded information of a current block in a current picture, the coded information being indicative of an advanced motion vector prediction-merge (AMVP-merge) mode, the AMVP-merge mode using a bi-directional predictor comprising an AMVP predictor in a first direction and a merge predictor in a second direction that is different from the first direction;
constructing an AMVP candidate list that includes a plurality of AMVP candidates for the AMVP predictor;
constructing a merge candidate list that includes a plurality of merge candidates for the merge predictor, the merge candidate list comprising at least a subblock-based temporal motion vector prediction (SbTMVP) candidate;
selecting the AMVP predictor from the AMVP candidate list;
selecting the merge predictor from the merge candidate list with the SbTMVP candidate; and
reconstructing the current block in the AMVP-merge mode according to a combination of a first prediction according to the AMVP predictor in the first direction and a second prediction according to the merge predictor selected from the merge candidate list with the SbTMVP candidate in the second direction.

2. The method of claim 1, wherein the merge predictor is determined to be the SbTMVP candidate, and the reconstructing the current block comprises:
determining, in a collocated picture for the current picture, a collocated block for the current block according to a displacement vector of the SbTMVP candidate, the current block comprising a plurality of subblocks, and the collocated block comprising a plurality of collocated subblocks respectively for the plurality of subblocks;
determining, a plurality of motion vectors respectively for the plurality of subblocks in the current block according to respective motion information of the plurality of collocated subblocks in the collocated block; and
generating a plurality of reconstructed subblocks respectively for the plurality of subblocks in the current block according to the plurality of motion vectors respectively for the plurality of subblocks in the current block, the plurality of reconstructed subblocks forming the second prediction.

3. The method of claim 1, wherein the constructing the merge candidate list further comprises:
deriving the SbTMVP candidate according to a motion vector of a spatial neighboring block of the current block.

4. The method of claim 3, wherein the deriving the SbTMVP candidate further comprises:

determining a collocated block in a collocated picture for the current picture according to the motion vector of the spatial neighboring block of the current block; and
in response to an available of subblock based motion information in the collocated block, using the motion vector of the spatial neighboring block as a displacement vector (DV) for the SbTMVP candidate.

5. The method of claim 4, wherein an availability of the subblock based motion information of the collocated block is determined based on an availability of a motion vector at a center subblock of the collocated block.

6. The method of claim 5, wherein the availability of the subblock based motion information of the collocated block is determined based on an availability of a motion vector associated with the second direction at the center subblock of the collocated block.

7. The method of claim 4, wherein an availability of the subblock based motion information of the collocated block is determined based on an availability of a motion vector associated with the second direction for at least one subblock in the collocated block.

8. The method of claim 3, wherein the deriving the SbTMVP candidate further comprises:
checking a plurality of spatial neighboring blocks in a predefined order;
identifying a first spatial neighboring block with a first motion vector among the plurality of spatial neighboring blocks, a collocated block according to the first motion vector having available subblock based motion information; and
using the first motion vector as a displacement vector (DV) for the SbTMVP candidate.

9. The method of claim 1, wherein the constructing the merge candidate list further comprises:
using zero displacement vector (DV) for the SbTMVP candidate.

10. The method of claim 9, further comprising:
checking a plurality of spatial neighboring blocks in a predefined order;
determining that none of the plurality of spatial neighboring blocks has available subblock based motion information in a corresponding collocated block; and
using zero displacement vector (DV) for the SbTMVP candidate.

11. The method of claim 2, wherein the determining the plurality of motion vectors respectively for the plurality of subblocks in the current block further comprises:
for a first subblock in the plurality of subblocks, in response to a lack of motion information in the second direction at a collocated subblock corresponding to the first subblock, determining a first motion vector for the first subblock according to at least one of:
a second motion vector of a neighboring subblock of the first subblock that is in the second direction;
a third motion vector of a center subblock of the collocated block that is in the second direction; and
a default motion vector.

12. The method of claim 2, wherein the determining the plurality of motion vectors respectively for the plurality of subblocks in the current block further comprises:
generating a binary mask for the plurality of subblocks in the current block, a binary bin in the binary mask for a subblock indicating an availability of a motion vector in the second direction.

13. The method of claim 12, wherein the reconstructing the current block comprises:

in response to the binary bin for the subblock indicating that the motion vector in the second direction is available, generating a first reconstructed subblock according to the AMVP predictor in the first direction;

generating a second reconstructed subblock according to the motion vector in the second direction; and reconstructing the subblock based on a combination of the first reconstructed subblock and the second reconstructed subblock.

14. The method of claim 12, wherein the reconstructing the current block comprises:

in response to the binary bin for the subblock indicating that the motion vector in the second direction is unavailable, generating a first reconstructed subblock according to the AMVP predictor in the first direction; and reconstructing the subblock based on the first reconstructed subblock.

15. The method of claim 1, wherein the merge candidate list comprises the SbTMVP candidate, one or more spatial neighboring merge candidates, and one or more temporal neighboring merge candidates in a predefined order.

16. The method of claim 1, wherein the merge candidate list comprises the SbTMVP candidate at a first position in the merge candidate list.

17. An apparatus for video decoding, comprising processing circuitry configured to:

receive a coded video bitstream comprising coded information of a current block in a current picture, the coded information indicative of an advanced motion vector prediction-merge (AMVP-merge) mode, the AMVP-merge mode using a bi-directional predictor comprising an AMVP predictor in a first direction and a merge predictor in a second direction;

construct an AMVP candidate list that includes a plurality of AMVP candidates for the AMVP predictor;

construct a merge candidate list that includes a plurality of merge candidates for the merge predictor, the merge candidate list comprising at least a subblock-based temporal motion vector prediction (SbTMVP) candidate that is added into the plurality of merge candidates for the merge predictor;

select the AMVP predictor from the AMVP candidate list;

select the merge predictor from the merge candidate list with the SbTMVP candidate; and reconstruct the current block in the AMVP-merge mode according to a combination of a first prediction according to the AMVP predictor and a first reference picture in the first direction and a second prediction according to the merge predictor selected from the merge candidate list with the SbTMVP candidate and a second reference picture in the second direction.

18. The apparatus of claim 17, wherein the merge predictor is determined to be the SbTMVP candidate, and the processing circuitry is configured to:

determine, in a collocated picture for the current picture, a collocated block for the current block according to a displacement vector of the SbTMVP candidate, the current block comprising a plurality of subblocks, and the collocated block comprising a plurality of collocated subblocks respectively for the plurality of subblocks;

determine, a plurality of motion vectors respectively for the plurality of subblocks in the current block according to respective motion information of the plurality of collocated subblocks in the collocated block; and generate a plurality of reconstructed subblocks respectively for the plurality of subblocks in the current block according to the plurality of motion vectors respectively for the plurality of subblocks in the current block, the plurality of reconstructed subblocks forming the second prediction.

19. The apparatus of claim 17, wherein the processing circuitry is configured to:

derive the SbTMVP candidate according to a motion vector of a spatial neighboring block of the current block.

20. The apparatus of claim 19, wherein the processing circuitry is configured to:

determine a collocated block in a collocated picture for the current picture according to the motion vector of the spatial neighboring block of the current block; and in response to an available of subblock based motion information in the collocated block, use the motion vector of the spatial neighboring block as a displacement vector (DV) for the SbTMVP candidate.

* * * * *